(No Model.)
H. J. BECKER.
WATER FILTER.
No. 426,756. Patented Apr. 29, 1890.
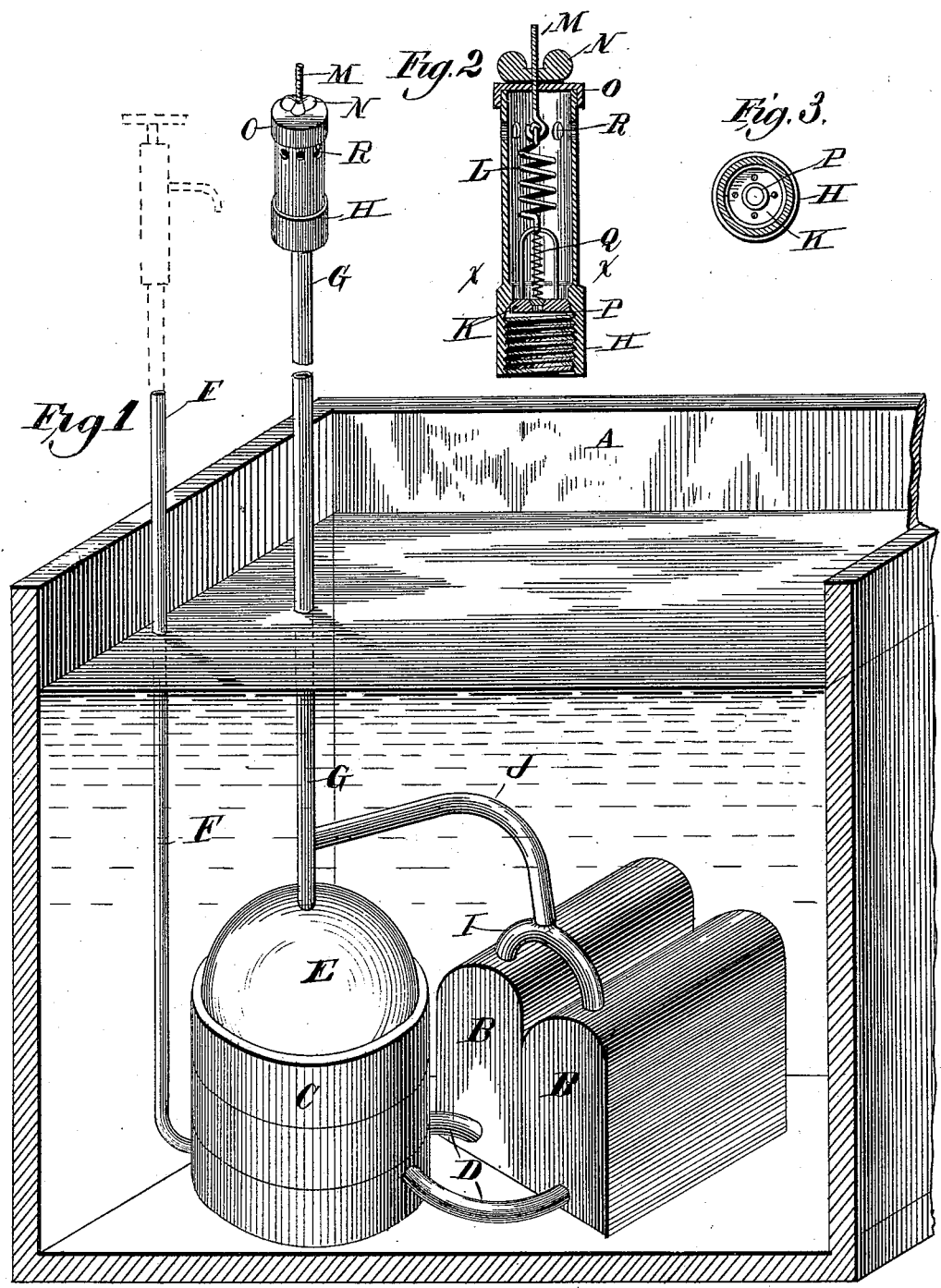
Witnesses:
F. R. Cornwall,
L. S. Bacon,
Inventor:
Henry J. Becker,
per H. A. Toulmin
his atty

UNITED STATES PATENT OFFICE.

HENRY J. BECKER, OF AKRON, OHIO.

WATER-FILTER.

SPECIFICATION forming part of Letters Patent No. 426,756, dated April 29, 1890.

Application filed July 8, 1889. Serial No. 316,886. (No model.)

*To all whom it may concern:*

Be it known that I, HENRY J. BECKER, a citizen of the United States, residing at Akron, in the county of Summit and State of Ohio, have invented certain new and useful Improvements in Water-Filters, of which the following is a specification, reference being had therein to the accompanying drawings.

This invention relates to certain new and useful improvements in the means for the purification of water. Its object is to secure the flow of water through the filtrating substance by producing a partial vacuum and to prevent the contamination of the purified water.

In the accompanying drawings, forming a part of this specification, and in which like reference-letters indicate corresponding parts, Figure 1 represents a sectional perspective view of a portion of a cistern or other receptacle for water with my improved apparatus immersed therein; Fig. 2, a vertical section of the valves and casing; Fig. 3, a cross-section of Fig. 2 on the line X X.

In Fig. 1, A designates a portion of a cistern or other receptacle for water. Immersed in this cistern is a porous vessel C, which may be of any convenient form and suitable material, by passing through which the water is purified. It is preferably of the form shown, and may be conveniently made of fire-brick. It has a dome-like top E, preferably made of glazed earthenware. A tube G extends from the dome E to a suitable elevation in the outside air, and a valve-case H is mounted upon said tube. One or more air-tight and water-tight vessels B are located in this cistern (or may be outside) and are connected by the pipes D D with the porous vessel C. These said air-tight vessels serve to store the purified water and are connected at the top by the pipe I, which communicates by means of the pipe J with the tube G aforesaid to admit of the escape of air from the vessels B. All the pipes, joints, and vessels (except C) are to be water and air tight. The valve-casing H (shown in vertical section in Fig. 2) contains two valves—one large one K, opening downward for admitting the air in that direction, and a smaller one P, seated in the larger one and opening upward to allow the passage of air upward through the said tube G. The smaller valve P is pressed on its seat by a light spring Q, while the larger valve K is controlled by a coil-spring L, having a hook M, with a screw-threaded shank, on which a nut N is fitted, said nut being supported by the cap O of the valve-case. By turning the nut N the tension of the spring L is readily adjusted for a purpose presently to appear. Near the top of the case are the holes R R for the escape of air that comes through the smaller valve P.

I will now describe the operation of the apparatus. The porous vessel C being immersed in the cistern A, and the storage-vessels B B being also placed below the level of the water in the cistern and all suitably connected, the pressure of the water will cause it to percolate through the porous vessel C and drive out the air into the tube G. The pressure of the air on the under side of the smaller valve P will lift it off its seat and compress the spring Q, and thus allow the air to find exit through the openings R R in the top of the case H. The water filling the porous vessel C will flow into the storage-vessels B B through the pipes D D and drive out the air there contained through the pipes I and J into the tube G, as already suggested, and thence it will find exit, as described above. The letter F designates a pipe connecting with the interior of the porous vessel and extending upward or to a suitable place for conveniently attaching to it a suction-pump of any approved type, as suggested by the dotted lines. The function of these devices is to draw off the water for domestic or other uses; and it will also be understood that if the pump be employed to aid in the exhaustion of the air from the porous vessel, the water will more rapidly percolate or enter said vessel. The action of the pump will cause a more or less perfect vacuum in said vessels and pipes, according to the adjusted tension on the spring L, which controls the valve K, and enables the valve to resist the influx of the external air under atmospheric pressure. The smaller valve P, opening upward, will remain closed, except when the pressure of the air within, seeking exit from the pressure of the rising water, is sufficient to overcome the action of the spring Q, together with the pressure of the external air. The said vessels B, B, and C, and connecting pipes being nearly filled with purified water, will have a tendency to remain in that condition, because the partial vacuum formed by drawing off some water through the pipe F will induce a rapid percolation through the vessel C in order to replace that quantity withdrawn. It will be evident that the water after being purified is not exposed to contamination, since it is kept in the storage-vessels aforesaid till drawn off for use. I thus obviate a prominent objection to the usual method of purifying water, which usually becomes contaminated again before use by exposure to unwholesome substances, liquids, or gases. It is obvious that the apparatus may be used without the storage-vessels, yet it is preferred to employ them.

It is to be observed that by reason of the creation of as perfect a vacuum as may be within the porous vessel, I am enabled to employ a filtering substance of finer texture and of greater thickness than usual, or than possible in the absence of the vacuum. The result is that the water is more perfectly filtered and is rendered purer and cleaner.

Having thus fully described my invention, what I claim as new, and desire to secure by Letters Patent, is—

1. In a filter, the combination, with a liquid-containing vessel, of a porous vessel located therein, an air-exit pipe leading from said porous vessel to the atmospheric air and provided with oppositely-opening valves, means to draw air and water from the porous vessel, and one or more air-tight storage-vessels communicating with said porous vessel and with said air-exit pipe.

2. In a filter, the combination, with a liquid-containing vessel, of a porous vessel located therein, an air-exit pipe provided with spring-controlled oppositely-opening valves, an air and water discharge pipe, a pump connected thereto, and one or more air-tight storage-vessels also within the liquid-containing-vessel and communicating with the porous vessel and its air-exit pipe.

3. In a filter, the combination, with a liquid-containing vessel, of a porous vessel located therein, an air-exit pipe or conduit, inlet and outlet valves therefor, and means to draw the water from within said porous vessel.

4. In a filter, the combination of a valve-casing, suitably connected to said filter-chamber with valves located in said casing, one of which opens downward for the purpose of admitting air in said direction through said tube, and the other of which opens upward for the purpose of allowing air to pass upward through said tube.

5. In a filter, the combination of a valve-casing and pipe-connections between the filter-chamber and the casing, with two spring-controlled valves located in said casing, one of which allows the air to pass upward on overcoming the slight influence of the opposing spring, and the other of which allows the air to pass downward through said tube, and means for adjusting the spring controlling the latter valve.

In testimony whereof I affix my signature in presence of two witnesses.

HENRY J. BECKER.

Witnesses:
W. Y. MASTERS,
P. B. WILLIAMS.